US010054950B2

(12) United States Patent
Carrasco Zanini et al.

(10) Patent No.: US 10,054,950 B2
(45) Date of Patent: Aug. 21, 2018

(54) FIELD DEPLOYABLE DOCKING STATION FOR MOBILE ROBOTS

(71) Applicant: Saudi Arabian Oil Company, Dhahran (SA)

(72) Inventors: Pablo Carrasco Zanini, Thuwal (SA); Ali Outa, Thuwal (SA); Fadl Abdellatif, Thuwal (SA); Brian Parrott, Dhahran (SA); Sahejad Patel, Thuwal (SA); Hassane Trigul, Thuwal (SA); Ayman Amer, Thuwal (SA); Ali Shehri, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 209 days.

(21) Appl. No.: 15/058,311

(22) Filed: Mar. 2, 2016

(65) Prior Publication Data
US 2016/0268823 A1    Sep. 15, 2016

Related U.S. Application Data

(60) Provisional application No. 62/130,347, filed on Mar. 9, 2015.

(51) Int. Cl.
*H02J 7/00* (2006.01)
*G05D 1/02* (2006.01)
(Continued)

(52) U.S. Cl.
CPC ............. *G05D 1/0225* (2013.01); *F17D 5/00* (2013.01); *H02J 7/0052* (2013.01); *H02J 50/10* (2016.02);
(Continued)

(58) Field of Classification Search
USPC ........................................ 320/107, 109, 137
See application file for complete search history.

(56) References Cited

U.S. PATENT DOCUMENTS 7,496,459 B2    2/2009  McAllister et al.
8,024,066 B2    9/2011  Reverte et al.
(Continued)

FOREIGN PATENT DOCUMENTS

WO    WO 2008002027 A1 *  1/2008

OTHER PUBLICATIONS

Ying Ni Duan et al., "Research on Key Technologies of the Cabless Pipline Robot", Advance Material Research, vol. 591-593, pp. 1221-1224. Nov. 29, 2012.

*Primary Examiner* — Brian Ngo
(74) *Attorney, Agent, or Firm* — Leason Ellis LLP

(57) ABSTRACT

A deployable docking station for supporting at least one mobile robot is provided. The deployable docking station includes a housing and an anchor connected to the housing. The anchor can engage with a surface to maintain the position of the deployable docking station. The deployable docking station is further configured to couple and decouple with the at least one mobile robot. The deployable docking station can be configured to selectively alternate between a first and second condition. In the first condition, the deployable docking station is coupled with the at least one mobile robot and the at least one mobile robot can transport the deployable docking station to a desired location on the surface. In the second condition, the deployable docking station is de-coupled from the at least one mobile robot.

39 Claims, 5 Drawing Sheets

(51) Int. Cl.
*H02J 50/10* (2016.01)
*F17D 5/00* (2006.01)
*H02J 7/02* (2016.01)

(52) U.S. Cl.
CPC .... *G05D 2201/0207* (2013.01); *H02J 7/0054* (2013.01); *H02J 7/025* (2013.01)

(56) References Cited

U.S. PATENT DOCUMENTS

| | | | |
|---|---|---|---|
| 9,606,541 B2* | 3/2017 | Abramson | G05D 1/0265 |
| 2005/0279270 A1 | 12/2005 | Wingett et al. | |
| 2007/0142964 A1* | 6/2007 | Abramson | A01D 34/008 |
| | | | 700/245 |
| 2007/0226949 A1* | 10/2007 | Hahm | A47L 9/009 |
| | | | 15/340.1 |
| 2007/0245511 A1* | 10/2007 | Hahm | A47L 9/106 |
| | | | 15/319 |
| 2008/0004751 A1* | 1/2008 | Chung | G05D 1/0225 |
| | | | 700/258 |
| 2008/0201895 A1* | 8/2008 | Kim | A47L 9/106 |
| | | | 15/319 |
| 2010/0324736 A1 | 12/2010 | Yoo et al. | |
| 2012/0303190 A1* | 11/2012 | Pfeiffer | G05D 1/0225 |
| | | | 701/22 |
| 2013/0231779 A1 | 9/2013 | Purkayastha et al. | |
| 2014/0015493 A1* | 1/2014 | Wirz | H02J 7/025 |
| | | | 320/137 |
| 2017/0164797 A1* | 6/2017 | Abramson | A47L 1/02 |

* cited by examiner

FIELD DEPLOYABLE DOCKING STATION FOR MOBILE ROBOTS

CROSS-REFERENCE TO RELATED APPLICATIONS

This application is based on and claims priority to U.S. Provisional Patent Application Ser. No. 62/130,347, filed on Mar. 9, 2015, which is hereby incorporated by reference as if set forth in its entirety herein.

FIELD OF THE INVENTION

The present invention relates to mobile robots, in particular to providing support services, utilities, and/or consumable resources to such robots.

BACKGROUND OF THE INVENTION

Mobile robots can play an integral role in the inspection of industrial complexes. Conventionally, in order to inspect the numerous elevated beams, pipes, and other hard-to-reach surfaces of an industrial complex, scaffolding must be built. However, the erection of such scaffolding can be dangerous, time consuming, labor intensive, and expensive. Further, the inspection of hard-to-reach areas of the industrial complex by workers using these scaffolds can be equally dangerous and time consuming. As such, the use of mobile robots can allow for more efficient inspection of particular areas of an industrial complex.

Currently, mobile robots alleviate many of the safety and labor concerns of previous inspection protocols; however they are not without drawbacks. For example, conventional mobile robots are designed to run either using their own power sources (e.g., batteries) or using an external power source (e.g., attached to an external power source via a power cord or tether). Mobile robots that run on their own power tend to have greater mobility in hard-to-reach places (e.g., pipes); however, they can only run for a limited period of time before the battery runs out. Conversely, mobile robots attached to an external power source have an extended period of operation, but may be less mobile due to physical restraints, such as the length of the power cord and the susceptibility of the power cord to get tangled.

In instances in which mobile robots run on their own power, fixed docking stations have been developed such that the mobile robots can return to a fixed docking station to recharge its battery or perform other tasks. However, because these docking stations must remain in a fixed location, they are limited to particular areas where a fixed docking station could be permanently attached. Further, due to the restrictions on the location of the fixed docking stations, mobile robots are likewise limited to inspecting areas near a docking station such that they are able to return to the docking station before the battery power runs out.

The present invention addresses these and other limitations associated with the efficiency of conventional mobile robots and inspection protocols.

SUMMARY OF THE INVENTION

According to an aspect of the present invention, there is provided a deployable docking station for providing support services to at least one mobile robot that is capable of traversing a surface. The deployable docking station includes a housing, which provides the mechanical framework for the deployable docking station and its components. The deployable docking station is capable of supplying one or more resources, including consumable resources, support services, and/or utilities to at least the mobile robot. In accordance with an aspect of the invention, the resources can be provided via a tether connected to the housing. According to a further aspect, the resources can be provided via an on-board supply source.

The deployable docking station further includes an anchor connected to the housing capable of engaging with the surface. The deployable docking station is also configured to couple and decouple with the at least one mobile robot. The deployable docking station can also be configured to receive and transmit data from the mobile robot, and configured to selectively alternate the deployable docking station between a first condition and a second condition. As described herein, a condition can be understood as a mechanical state. In the first condition, the detachable couple is engaged with the mobile robot, the anchor is disengaged from the surface, and the mobile robot is capable of transporting the deployable docking station to a desired location along the surface. In a second condition, the detachable couple is disengaged from the mobile robot and the anchor is engaged with the surface. In accordance with a further aspect, to transition from the first condition to the second condition, the anchor must first be engaged with the surface prior to the detachable couple being disengaged from the mobile robot. In accordance with another aspect, to transition from the second condition to the first condition, the detachable couple must first be engaged with the mobile robot prior to disengagement of the anchor from the surface. More generally, the coupling between coupled and decoupled conditions transitions, in accordance with a prescribed sequence, to ensure the safety of the deployable docking station.

In accordance with a further aspect, the deployable docking station can also include a control module connected to the housing, wherein the control module is configured to receive and transmit data from the mobile robot, as well as selectively alternate the deployable docking station between the first condition and the second condition.

In accordance with a further aspect, the consumable resource supplied to the deployable docking station via the tether is power such that the mobile robot can re-charge its battery or use the power directly to power the robot's systems when it is engaged with the detachable couple of the deployable docking station.

In accordance with yet a further aspect, the engagement between the anchor and the surface is magnetic. In accordance with a further optional aspect, the anchor comprises one or more permanent magnets.

In accordance with yet a further aspect, the deployable docking station can include a support connected to the housing, such that the support is capable of engaging the surface to assist the deployable docking station in maintaining its position on the surface. In accordance with a further aspect, the support can comprise members that include wheels such that the wheels contact the surface. In a further aspect, the wheels can be positioned such that the detachable couple 140 does not move between the first condition and the second condition, thus allowing for easier connection to the mobile robot.

In accordance with a further aspect, the deployable docking station is capable of emitting a signal that can be received by the mobile robot to assist the mobile robot in locating the deployable docking station. This aspect can be useful in maintaining an absolute reference point for the mobile robot during its operation from the point of deployment.

These and other aspects, features, and advantages can be appreciated from the accompanying description of certain embodiments of the invention and the accompanying drawing figures and claims.

DETAILED DESCRIPTION CERTAIN OF EMBODIMENTS OF THE INVENTION

Figure 1:
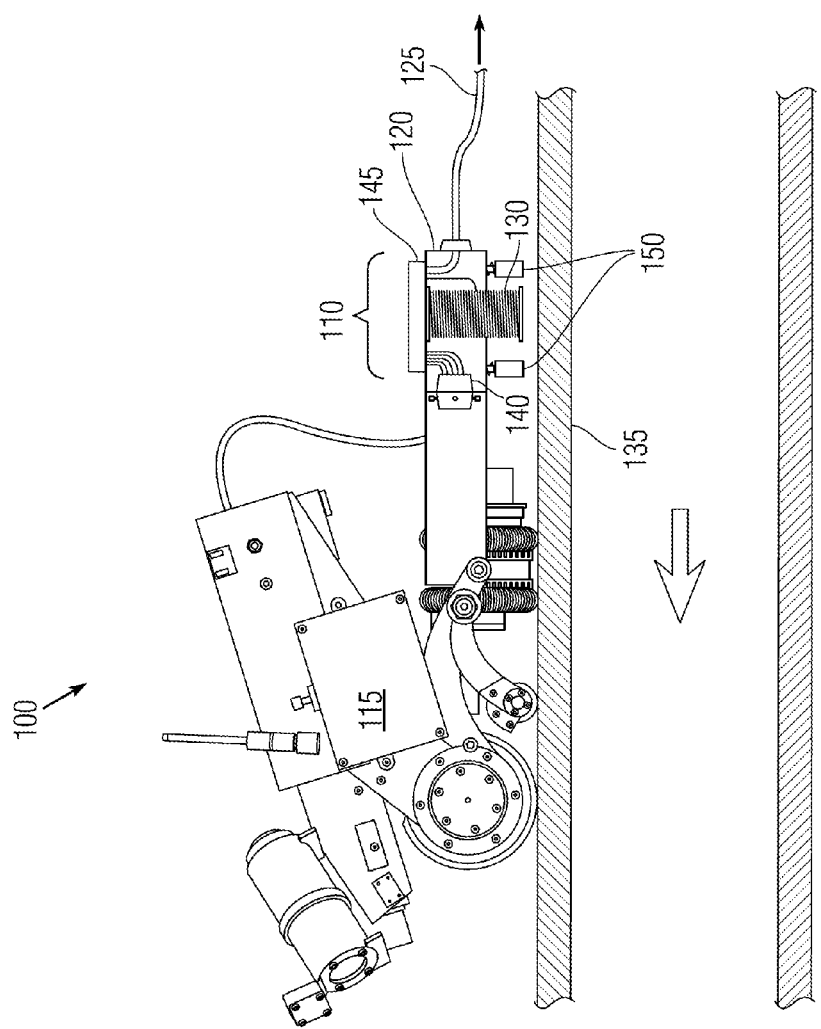
FIG. 1 is a side view of a mobile robot system, including a deployable docking station in a first condition in accordance with at least one embodiment of the present application.

According to one or more embodiments, a deployable docking station for supporting mobile robots is provided. The deployable docking station can be used to assist one or more mobile robots in the inspection of certain areas of an industrial complex.

The deployable docking station can provide consumable and/or non-consumable resources to at least one mobile robot. The deployable docking station can further include an anchor that can engage a surface when the deployable docking station is deployed at a location along the surface. The deployable docking station can also include a coupling mechanism, such as a detachable couple that can couple with a mobile robot.

In at least one embodiment, the deployable docking station is designed to support mobile robots in an inspection in such a way that the mobile robot, when coupled to the deployable docking station, can transport the docking station to one or more desired locations along a surface. At a desired location, the deployable docking station can enable its anchor such that the anchor engages the surface, thereby allowing the deployable docking station to remain fixed at that location. At the desired location, the deployable docking station and the mobile robot can de-couple from one another, thereby allowing the mobile robot to perform functions away from the docking station. After performing its functions, the mobile robot can optionally return to the docking station for re-coupling and various support functions, such as re-charging its battery, high-speed data transferring, Wi-Fi signal repeating, calibration of inspection sensors, correction of drift in localization data, protection from environmental conditions (e.g., rain, wind, sunlight) transporting the docking station to a different location.

An exemplary embodiment of the mobile robot and deployable docking station system 100 is shown in FIGS. 1-4. The system 100 includes at least one deployable docking station 110 and at least one mobile robot 115. The deployable docking station 110 comprises a housing 120, which provides the mechanical framework for the deployable docking station 110 and components supported thereby. Components of the deployable docking station 110 can be mounted on or within the housing 120, or a combination thereof. In one or more embodiments, the housing 120 can be a chassis frame to which various components of the deployable docking station 110 are mounted. In at least one embodiment, the housing 120 can be an open-frame structure.

The deployable docking station 110 can provide one or more resources to one or more mobile robots. The resources can be consumable resources and/or non-consumable resources. In at least one embodiment, the resource(s) can be provided by the deployable docking station 110 via an on-board supply source.

In at least one embodiment, the resource(s) can be provided by the deployable docking station via a tether 125 that is connected to the housing 120, as shown in FIGS. 1-4. The tether 125 can supply one or more resources to the deployable docking station 110 from a remote source. Further, in at least one variation, the tether 125 can comprise a pneumatically powered conveyor tube that includes a transport lumen such that samples collected by the mobile robot 115 and/or the deployable docking station 110 can be transported from the deployable docking station 110 to a remote location (e.g., a control center) via the tether 125. In one or more embodiments, the tether 125 provides power to the deployable docking station 110 by being attached to a remote power source (not shown). In at least one variation, the deployable docking station 110 can also comprise one or more solar panels attached to the housing 120, which are capable of harnessing solar energy for use as a secondary power source by the deployable docking station 110. In certain embodiments, the deployable docking station 110 can also include a rechargeable battery pack to power the deployable docking station 110 independent of a remote power source. The rechargeable battery pack can be located within the housing 120 or can be connected to the housing 120.

The one or more consumable resources can include but are not limited to power, air, pressurized air, paint, gas, oil, fuel, water and/or other liquid resources. The one or more non-consumable resources can include, but are not limited to high-speed communication and a shading cover to protect the mobile robot 115 from environmental hazards. In at least one embodiment, the one or more consumable resources can also be supplied to the mobile robot 115 when the mobile robot 115 is coupled with the deployable docking station 110.

Referring again to FIGS. 1-4, the deployable docking station 110 also comprises an anchor 130 connected to the housing 120 that is capable of engaging a surface 135 (upon which the deployable docking station 110 is transported) in order to deploy the station. The anchor 130 can engage the surface 135 using numerous techniques including but not limited to magnets, electromagnets, negative air pressure (e.g., vacuum), suction, dry adhesion (e.g., nano-textured adhesive material), friction-based adhesion, electrostatic adhesion, or any combination thereof.

In at least one embodiment, the anchor 130 can be configured to act as a failsafe such that the deployable docking station 110 remains attached to the surface in the event of an unexpected power failure. For example, in at least one embodiment (e.g., when the surface 135 is magnetic/ferromagnetic), the anchor 130 engages the surface 135 via one or more permanent magnets within the anchor 130, which can allow for a safe attractive force towards the surface 135 even in the event of a power failure to the deployable docking station 110. The permanent magnets in the anchor 130 can be robotically adjustable in order to engage or disengage the anchor 130 from the surface 135. The position of the permanent magnet(s) within the anchor 130 can be adjustable. For example, there can be an adjustable mount on the anchor such that positioning of permanent magnet(s) is adjustable. Further, in at least one implementation, the magnetic flux circuit created by the permanent magnet(s) can be disrupted on command via a signal from the deployable docking station 110, thereby causing the anchor 130 to disengage from the surface 135. More specifically, mechanically engaged pieces of ferromagnetic material such as carbon steel can be incorporated into certain sections of the permanent magnet(s) such that they provide an alternate path for the magnetic flux, thereby significantly reducing the attractive force of the magnet on the surface (in some cases, reducing the attractive force to almost zero). In another implementation, the deployable docking station 110 can have an electromagnet to counteract the permanent magnet(s) via a signal from the deployable docking station 110 and thereby cause the anchor 130 to disengage from the surface 135. For example, the permanent magnet(s) can be presented in a north-south orientation, and an electromagnet can have a magnetic field that counteracts the permanent magnets.

Figure 2:
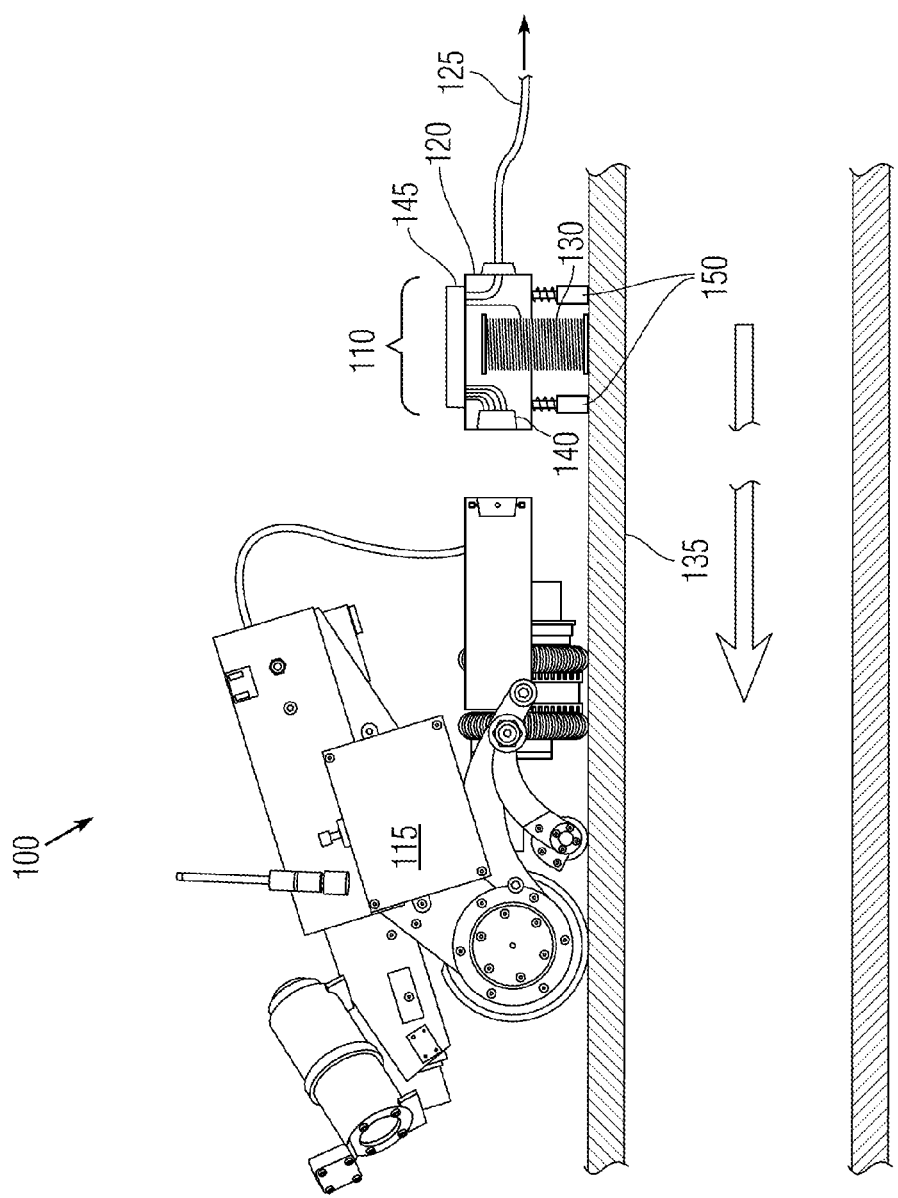
FIG. 2 is a side view of a mobile robot system, including a deployable docking station in a second condition in accordance with at least one embodiment of the present application.
Figure 3:
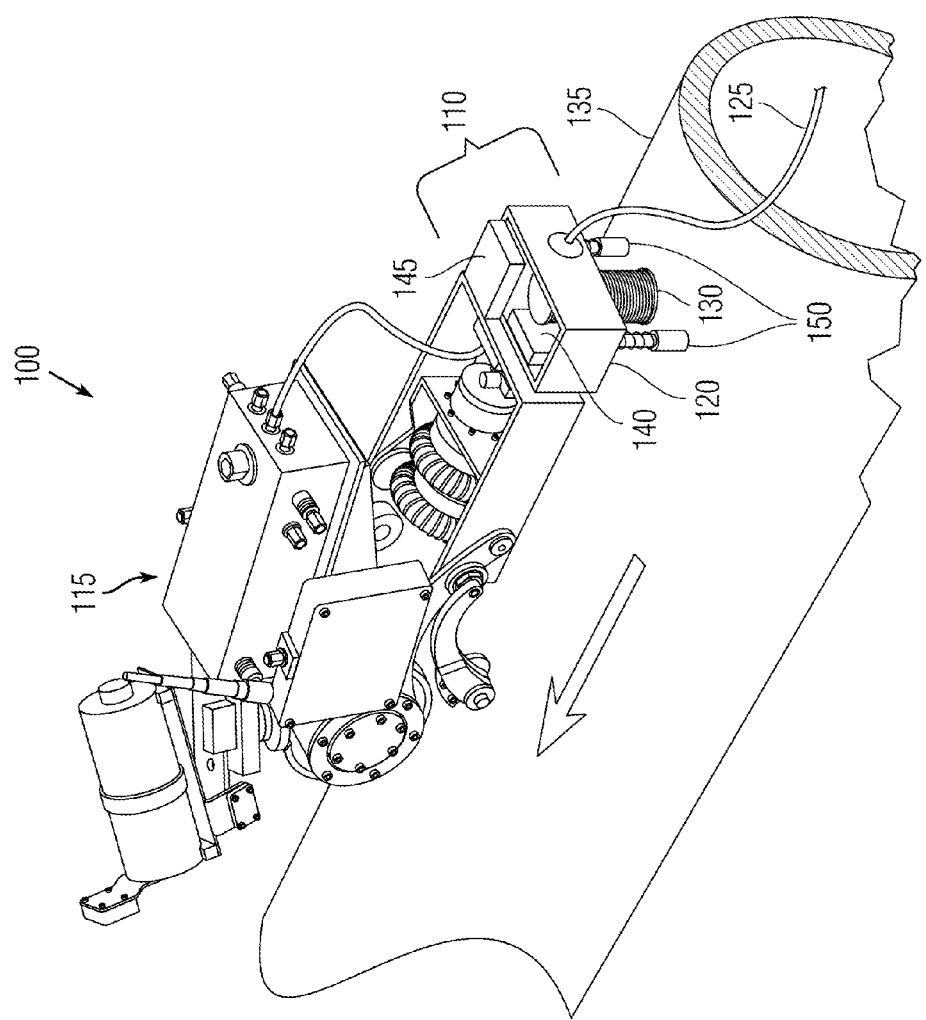
FIG. 3 is a perspective view of a mobile robot system, including a deployable docking station in a first condition in accordance with at least one embodiment of the present application.
Figure 4:
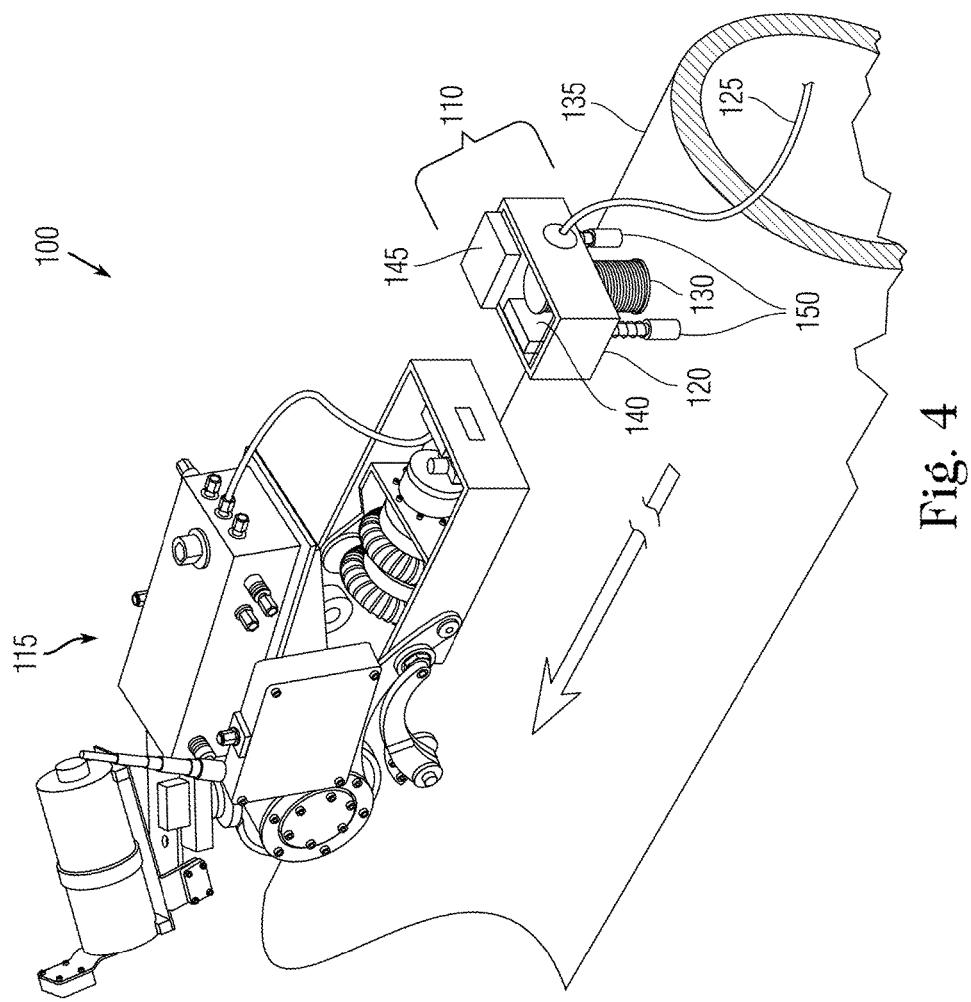
FIG. 4 is a perspective view of a mobile robot system, including a deployable docking station in a second condition in accordance with at least one embodiment of the present application.

In one or more embodiments, the mechanism by which the anchor 130 engages (and disengages) the surface 135 is actuated, for instance, via a signal from the deployable docking station 110. For example, a signal from the deployable docking station 110 can cause the anchor 130 to move vertically from its position above the surface 135 (as shown in FIG. 1) to a position attached to the surface 135 (as shown in FIG. 2). At least one embodiment, the means of generating adhesion force is passive, which can include, for instance, permanent magnets and dry adhesion.

In one or more variations, the deployable docking station 110 can have a mechanism for fixing the station's position on command with respect to the surface 135. For example, a permanent magnet can be connected via one or more springs to the housing 120 of the deployable docking station 110 and designed to remain attached to the surface 135 by default (leaving the spring in an extended configuration). The permanent magnet is selected such that it produces sufficient attraction, and therefore friction, between the deployable docking station 110 and the surface 135 to allow the deployable docking station 110 to remain fixed at that location. In at least one embodiment, an electro-magnet attached to the deployable docking station 110 could then be used counteract the permanent magnet(s) (via a signal from the deployable docking station 110) and thereby cause the permanent magnet to disengage from the surface 135.

The deployable docking station 110 can be configured to couple and decouple with the at least one mobile robot 115. For example, the deployable docking station 110 can further comprise a detachable couple 140 that is connected to the housing 120. In one more embodiments, the deployable docking station 110 and the mobile robot 115 can couple to one another via a coupling. The coupling between the deployable docking station 110 and the mobile robot 115 (e.g., the detachable couple 140 coupling with the mobile robot 115) can be accomplished in various ways including but not limited to magnetic coupling, mechanical coupling, electrical coupling, electromechanical coupling, or any combination thereof. In one or more embodiments, the detachable couple 140 is capable of transferring materials between the deployable docking station 110 and the mobile robot 115 (e.g., via a pneumatically powered conveyor tube that can include a transport lumen), including but not limited to gas, oil, fuel, paint, water and/or other liquid resources, as well as samples collected by the mobile robot 115. In at least one embodiment, the detachable couple 140 can comprise electric contacts that are sized, shaped, and conditioned such that they are capable of transferring power from the deployable docking station 110 to the mobile robot 115 during coupling. This power can be used to recharge the battery of the mobile robot 115.

In one or more embodiments, the engagement of the deployable docking station 110 with the mobile robot 115 (e.g., the detachable couple 140 with the mobile robot 115) is sparkless, such that in circumstances in which the system 100 is located in an area where flammable vapors are present, the coupling process will not cause a fire. In at least one embodiment, the electrical connection of deployable docking station 110 with the mobile robot 115 (e.g., the detachable couple 140 with the mobile robot 115) is via inductive wireless coupling, such as wireless Qi charging, by way of example and not limitation. While the exemplary embodiments show the deployable docking station 110 comprising the detachable couple 140, it should be understood that in other embodiments the deployable docking station 110 can couple and decouple with the mobile robot(s) 115 using mechanisms in which the detachable couple is located on the mobile robot 115. Alternatively, in embodiments in which neither the mobile robot 115 nor the deployable docking station 110 have a detachable couple, and the deployable docking station 110 and the mobile robot 115 can couple via magnetic surfaces of the deployable docking station 110 and/or the mobile robot 115, for example.

As described in greater detail below, the coupling (or de-coupling) of the deployable docking station 110 and the mobile robot 115 can be activated via a signal from the deployable docking station 110 to cause the deployable docking station 110 to couple or de-couple from the mobile robot 115. In at least one variation, a signal causing the coupling or de-coupling of the deployable docking station 110 and the mobile robot 115 can originate from the mobile robot 115. In at least one embodiment, as shown in FIGS. 1-4, the coupling of the deployable docking station 110 and the mobile robot 115 can be controlled by a control module 145 attached to the housing 120, wherein the control module 145 sends a signal to cause the mobile robot 115 to detach from the deployable docking station 110. In certain embodiments, the control module 145 can be located within the housing 120, or it can be mounted on the outside of the housing 120.

In alternative embodiments, the mobile robot 115 or the deployable docking station 110 can carry a device connected to the housing 120 for detaching from the mobile robot 115. In at least one embodiment, the coupling (or de-coupling) of the deployable docking station 110 and the mobile robot 115 can be activated via a signal from an operator control center.

In one or more embodiments, correction of any misalignment in coupling between the deployable docking station 110 and the mobile robot 115 can be accomplished by moving the deployable docking station 110 vertically. For instance, in embodiments in which the deployable docking station 110 comprises a detachable couple 140, moving the deployable docking station 110 vertically causes the detachable couple 140 to move vertically to correct misalignment with the mobile robot 115. Alternatively, the detachable couple 140 can be moved vertically with respect to the station 110 to correct the misalignment. Similarly, in at least one embodiment, correction of misalignment in coupling can be accomplished by moving the mobile robot 115 and/or its couple vertically rather than the deployable docking station 110. To move the deployable docking station 110 (and/or the detachable couple 140) vertically to correct misalignment, the deployable docking station 110 can, for example, have an actuator such that when the actuator is engaged, the deployable docking station 110 (and/or the detachable couple 140) can shift vertically relative the mobile robot 115 to correct any misalignment. In at least one embodiment, the mobile robot 115 could have an actuator such that when the actuator is engaged, the mobile robot 115 (and/or its couple) can shift vertically relative the deployable docking station 110 to correct any misalignment.

In at least one embodiment, the housing 120 of the deployable docking station 110 can comprise a top portion that contains the detachable couple 140, wherein the top portion is capable of rotating about a central axis of the housing 120. By rotating the top portion, the deployable docking station 110 can rotate the location of the detachable couple 140 such that a mobile robot 115 can couple with the detachable couple 140 from any side of the deployable docking station 110.

In at least one embodiment, the deployable docking station 110 is capable of coupling with multiple robots within a robotic system. More specifically, the deployable docking station 110 is not limited to coupling with a particular mobile robot, but rather can couple with any compatible mobile robot in the system 100.

The deployable docking station 110 can be configured to receive data from and transmit data to the mobile robot 115 and/or an operator control center via wireless communication protocols (e.g., Wi-Fi, RF, Zigbee). The deployable docking station 110 can also be configured to selectively alternate between a first condition and a second condition. This alternation can be accomplished through a signal from the mobile robot 115 to the detachable couple 140. In the first condition, as shown in FIG. 1, the detachable couple 140 is engaged with the mobile robot 115 and the anchor is disengaged from the surface 135 such that the mobile robot is capable of transporting the deployable docking station along the surface 135. For example, in an embodiment in which the mobile robot 115 is an inspection robot for an industrial complex, the mobile robot 115 can transport the deployable docking station 110 to a location near an apparatus or area the robot plans to inspect such that the mobile robot 115 can easily return to the deployable docking station 110 after inspection. Moreover, in at least one embodiment, the mobile robot 115 can be a magnetic crawler robot with magnetic wheels that can allow it to move in inverted fashioned along the bottom side of a horizontal pipe, and the deployable docking station 110 can have an anchor 130 comprising permanent magnets such that it can be deployed in an inverted fashion along the bottom side of a horizontal pipe.

As would be understood by those in the art of robotics, the deployable docking station 110 can include functional hardware components specifically designed to facilitate performing operational tasks, including tasks with one or more mobile robots 115. The deployable docking station can also include electronic circuitry within the housing 120 that includes a memory and/or computer readable storage medium which are configured to store information relating to the operation of the deployable docking station such as configuration settings and one or more control programs.

Figure 5:
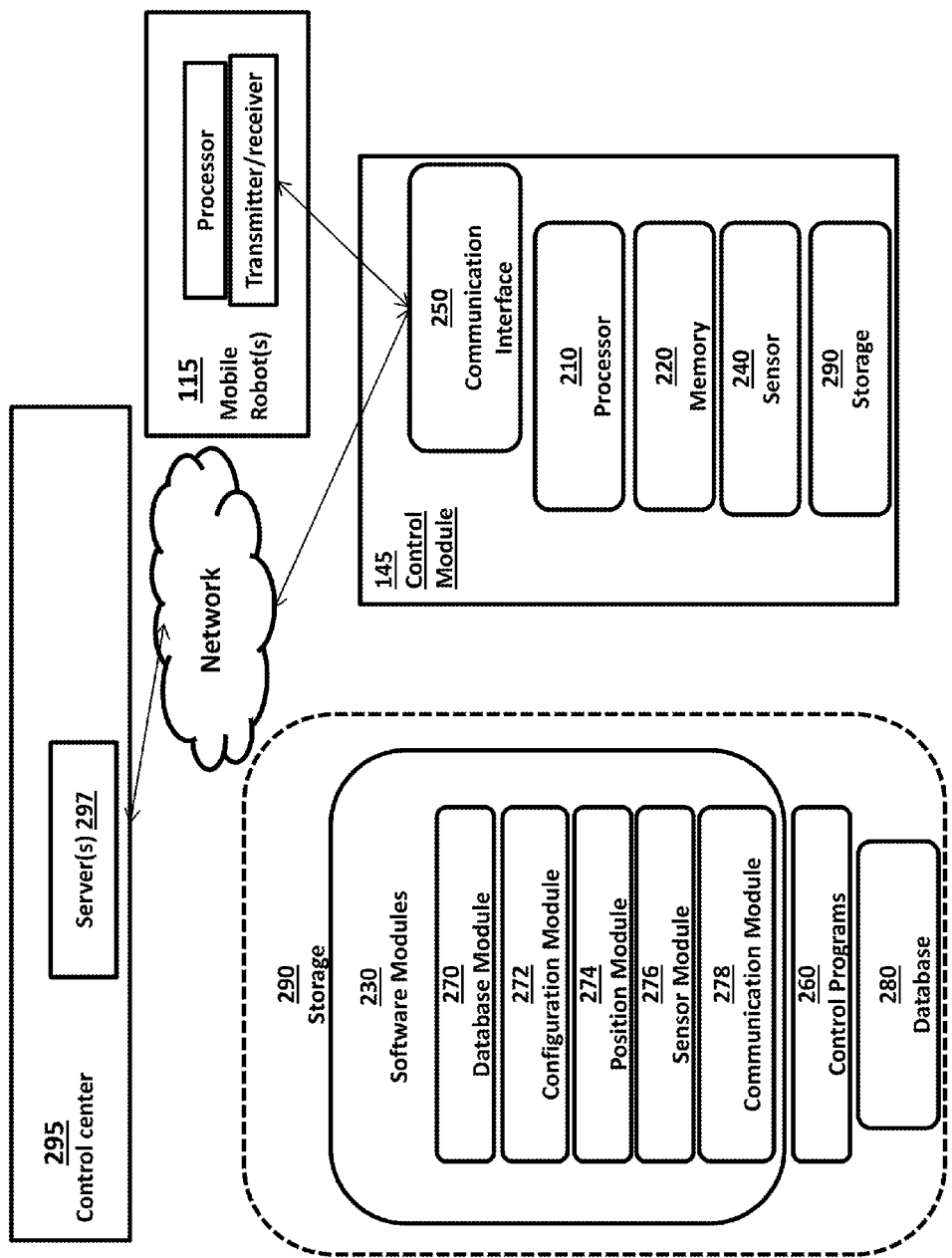
FIG. 5 is a high-level diagram illustrating an exemplary control module of the deployable docking station in accordance with at least one embodiment of the present application.

More specifically, the deployable docking station 110 can comprise a control module 145, which can be attached to the housing 120. An exemplary control module 145 in accordance with at least one embodiment is shown at FIG. 5. As shown in FIG. 5, the control module 145 can be arranged with various hardware and software components that serve to enable operation of the system, including a processor 210, a memory 220, a sensor 240, a communication interface 250 and a computer readable storage medium 290. The processor 210 serves to execute software instructions that can be loaded into the memory 220. The processor 210 can be a number of processors, a multi-processor core, or some other type of processor, depending on the particular implementation. In one or more embodiments, the one or more mobile robots 115 can also comprise various hardware and software components (e.g., processor, memory, communication interface).

Preferably, the memory 220 and/or the storage 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable or remote such as cloud based data storage systems.

One or more software modules 230 are encoded in the storage 290 and/or in the memory 220. The software modules 230 can comprise one or more software programs or applications having computer program code or a set of instructions executed in the processor 210. Such computer program code or instructions for carrying out operations and implementing aspects of the systems and methods disclosed herein can be written in any combination of one or more programming languages. The program code can execute entirely on deployable docking station 110, as a stand-alone software package, partly on the deployable docking station 110 and partly on a remote computer/device or entirely on such remote computers/devices. In the latter scenario, the remote computer systems can be connected to deployable docking station 110 through any type of network, including a local area network (LAN) or a wide area network (WAN), or the connection can be made through an external computer (for example, through the Internet using an Internet Service Provider).

Preferably, included among the software modules 230 are a database module 270, a configuration module 272, a position module 274, a sensor module 276, and a communication module 278 that are executed by processor 210. During execution of the software modules 230, the processor 210 is configured to perform various operations relating to the configuration of the deployable docking station, as will be described in greater detail below. In addition, it should be noted that other information and/or data relevant to the operation of the present systems and methods can also be stored on the storage 290, for instance various control programs 260 used in the configuration of the deployable docking station 110.

A database 280 can also be stored on the storage 290. Database 280 can contain and/or maintain various data items and elements that are utilized throughout the various operations of the deployable docking station system 100. Preferably, some or all of the stored information in the database 280 can be actionable data that is in a form or can be transformed into a form that enables the deployable docking station 110 to undertake an action as needed by the program that implements any given application. The database can also include device-specific applications that, when executed by the processor 210, configure the processor to communicate with the one or more mobile robots 115. Similarly, the database can store other operational parameters that are specific to the deployable docking station 110 and/or mobile robot(s) 115.

It should be noted that although database 280 is depicted as being configured locally to the storage of the deployable docking station 110, in certain implementations, database 280 and/or various of the data elements stored therein can be located remotely (such as on a remote server—not shown) and connected to the deployable docking station 110 through a network in a manner known to those of ordinary skill in the art.

A communication interface 250 is also operatively connected to the processor 210 and can be any interface that enables communication between the deployable docking station 110 and external devices, machines and/or elements such as the mobile robot(s) 115. Preferably, the communication interface 250 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting deployable docking station 110 to other computing devices and/or communication networks, such as private networks and the Internet. Such connections can include a wired connection or a wireless connection (e.g., using the IEEE 802.11 standard) though it should be understood that communication interface 250 can be practically any interface that enables communication to/from the deployable docking station 110.

The control module 145 can be configured to receive data from and transmit data to the mobile robot 115 and/or an operator control center 295 (which can comprise one or more servers 297) via wireless communication protocols (e.g., Wi-Fi, RF, Zigbee). The control module 145 can also be configured to selectively alternate the deployable docking station 110 between a first condition and a second condition. In one or more embodiments, this alternation can be accomplished through a signal from the control module 145 to the detachable couple 140 and/or the mobile robot 115. Additionally, in the first condition, the deployable docking station 110 can provide various support services for the mobile robot 115 via the detachable couple 140 including, but not limited to, battery re-charging (e.g., via power supplied via the tether 125 or a separate battery within the deployable docking station 110), high-speed data transferring, and material transferring. In one or more embodiments, more than one of the support services can be provided by the deployable docking station 110 simultaneously. In at least one variation, the different support services are provided by the deployable docking station 110 sequentially.

In certain embodiments, the deployable docking station 110 can have an independent locomotion system such that it can move along the surface 135 without the assistance of the mobile robot 115 (e.g., when the deployable docking station 110 is in the second position). This can allow the deployable docking station 110 to move to a location that is closer to the mobile robot 115 to expedite re-coupling and support services. The independent locomotion system can include, for example, motorized wheels, motorized magnetic wheels, motorized wheels combined with permanent or electro-magnets on the housing 120, and/or tank treads. In the second condition, as shown FIG. 2, the detachable couple 140 is disengaged from the mobile robot 115 and the anchor 130 is engaged with the surface 135, such that the deployable docking station 110 remains fixed ("deployed") at its current location along the surface 135. In one or more embodiments, to transition from the first condition to the second condition, the anchor 130 must first be engaged with the surface 135, and then the detachable couple 140 disengaged from the mobile robot 115. Engaging the anchor 130 with the surface 135 prior to disengagement of the detachable couple 140 can enhance the safety of the deployable docking station 110 in situations in which the docking station could fall from the surface 135, for example when the surface 135 is slanted. Likewise, in transiting from the second condition back to the first condition, engagement of the detachable couple 140 to the mobile robot 115 prior to the disengagement of the anchor 130 from the surface 135 can enhance the safety of the deployable docking station 110 in situations in which the docking station could fall from the surface 135.

In order to further enhance safety in certain embodiments, during the transition from the first condition to the second condition, confirmation of anchor engagement with the surface 135 can be required before disengagement of the detachable couple 140 from the mobile robot 115. This can be accomplished via a sensor attached to the deployable docking station 110, wherein the sensor can determine whether anchoring with sufficient force to maintain the deployable docking station on the surface 135 has been achieved. Similarly, in one or more embodiments, during the transition from the second condition back to the first condition, confirmation of coupling between the detachable couple 140 and the mobile robot 115 prior to anchor disengagement can be required, which can also be accomplished via sensor attached to the deployable docking station 110.

The transition from the first condition to the second condition can be accomplished through a signal from the mobile robot 115 (or in some embodiments, the control module 145) to the detachable couple 140. Alternatively, the transition can be accomplished via a signal from the deployable docking station 110 (or in some embodiments, the control module 145) to the mobile robot 115. In other words, in certain embodiments, a signal to the detachable couple 140 can cause the deployable docking station 110 to de-couple from the mobile robot 115, and in other embodiments, a signal to the mobile robot 115 can cause the robot 115 to de-couple from the deployable docking station 110.

In at least one embodiment, when the deployable docking station 110 is in the second condition, the mobile robot 115 can move along the surface 135 independent of the deployable docking station 110. For example, in an embodiment in which the mobile robot 115 is an inspection robot for an industrial complex, the mobile robot 115 can inspect pipes and other aspects of the industrial complex independent of the deployable docking station 110. This can allow the mobile robot 115 to inspect areas that are not accessible by the deployable docking station 110 (e.g., an area in which the tether 125 could get tangled). More specifically, by deploying the deployable docking station 110, the mobile robot 115 has improved maneuverability as is can avoid entanglement of the tether and does not have to carry the excess weight of the deployable docking station 110. In at least one embodiment, the inspections can be performed by the mobile robot 115 while the mobile robot 115 is coupled with the deployable docking station 110 (i.e., the deployable docking station 110 is in the first condition).

After inspection independent of the deployable docking station 110, the mobile robot 115 can later re-couple to the deployable docking station 110 such that the mobile robot 115 may transfer data and/or materials to the deployable docking station 110 or vice versa. Additionally, in one or more embodiments, the mobile robot 115 can re-couple to the deployable docking station 110 so that the battery of the mobile robot 115 can be recharged via power transferred from the deployable docking station 110. In one or more embodiments, the deployable docking station 110 can emit a signal (in certain embodiments, via the control module 145) that can be received by the mobile robot 115, wherein the signal can assist the mobile robot 115 in locating the deployable docking station 110 for re-coupling. For example, the processor 210 executing one or more software modules 230, including position module 274 and sensor 276, configures the control module 145 to transmit a signal to the mobile robot 115 to assist the robot in locating the deployable docking station 110 for re-coupling. In at least one embodiment, the signal can be transmitted when the deployable docking station 110 is in the second condition. The signal can be, but is not limited to, one or more of the following: a visible light source, an infrared light source, a radio signal, or a GPS signal. This aspect can be useful in maintaining an absolute reference point for the mobile robot during its operation from the point of deployment.

Additionally, in one or more embodiments, the deployable docking station 110 can function as a localization reference point for nearby mobile robots in the system 110, thereby allowing a mobile robot 115 to periodically correct any drifting error in its localization data (e.g., laser-beam referencing). For example, the deployable docking station 110 can be deployed on a pipe and configured to have a low-power laser beaming along the length of the pipe as the mobile robot 115 runs its inspection on the pipe. Further, the mobile robot 115 can follow a helical path during its inspection of the pipe such that, during the inspection, the robot 115 can be notified every time it crosses the path of the laser beam, thereby providing an additional point of reference for the localization estimate. This allows for greater accuracy in estimating the location of the mobile robot 115 during and after inspection.

The deployable docking station 110 and the mobile robot 115 can communicate with one another when the deployable docking station 110 is in the first condition and the second condition. The deployable docking station 110 can communicate with the mobile robot 115 via any suitable standard communication protocol known in the art, including but not limited to Wi-Fi, RF, Zigbee, Serial UART, SPI, or i2c. In at least one embodiment, the standard communication protocol of the deployable docking station 110 can be controlled by the control module 145. In at least one embodiment, a high-speed communication protocol (e.g., gigabit Ethernet) can be employed by the deployable docking station 110 for communication with the mobile robot 115 as well as for relaying messages from the mobile robot 115 to an operator control center. In one or more embodiments, the deployable docking station 110 can include a Wi-Fi router, a wireless signal repeater, and/or an access point, thereby improving signal coverage for the mobile robot 115 for communication with other systems, such as an operator control center.

In at least one embodiment, the control module 145 can comprise a single module in communication with an operator control center 295 remote from the deployable docking station 110. In one or more embodiments, the control module 145 can comprise several modules in communication with control module 145, which can be in communication with an operator control center 295 remote from the deployable docking station 110.

In at least one embodiment, the deployable docking station 110 can include a support 150 that is connected to the housing and is capable of engaging the surface 135. In certain embodiments, the control module 145 can be used to activate the support 150 when the deployable docking station 110 is in the second condition such that the support 150 engages the surface 135 and stabilizes the deployable docking station 110 on the surface 135 at a desired location. The support 150 can be used in addition to the anchor 130 to prevent the deployable docking station 110 from moving once it has been deployed in the second condition. The support 150 can comprise, for example, one or more hemispheric low-friction members, one or more posts, or one or more legs (as shown in FIGS. 1-4).

The stabilization of the deployable docking station 110 by the support 150 can also allow for easier re-coupling with the mobile robot 115 as the deployable docking station 110 (and in certain embodiments, the detachable couple 140) can be more easily aligned with the mobile robot 115 if the deployable docking station 110 is substantially stationary. In a preferred embodiment, the support 150 comprises at least three support members which each make contact points with the surface 135.

In at least one embodiment, the support 150 can comprise one or more legs in which each leg includes a wheel on its distal end, wherein the wheel is capable of engaging the surface 135. In a further aspect, the wheels can be positioned such that the detachable couple 140 does not move between the first condition and the second condition, thus allowing for easier connection to the mobile robot 115. In one or more embodiments, the control module 145 can be used to activate the support 150 in the first condition such that the wheels of the support 150 engage the surface 135 and allow the deployable docking station 110 to be rolled or dragged by the mobile robot 115. In this embodiment, the mobile robot 115 does not have to carry the entire weight of the deployable docking station 110 when transporting it. In one or more variations, the wheels can be replaced with spherical rollers or ball casters, or one or more hemispheric, low-friction members.

In at least one embodiment, the deployable docking station 110 can also comprise an inspection probe connected to the housing 120, such that the deployable docking station 110 can provide calibration data to nearby mobile robots. In at least one implementation, the inspection probe is an ultrasonic inspection probe.

In at least one embodiment, the deployable docking station 110 can be configured to protect the mobile robot 115 from environmental conditions (e.g., rain, wind, sunlight) during coupling. For example, the deployable docking station 110 can comprise a shading cover connected to the housing 120 that partially or fully covers the mobile robot 115 during coupling.

In conventional inspection robot systems, while mobile robots are capable of running on their own battery power, they are limited in range as they must remain in close proximity to the nearest fixed docking station such that they can return to the station when most of the battery power has been consumed. In contrast, the above described deployable docking station allows mobile robots to increase their range and the amount of inspection time, as they can transport the deployable docking station to a location that is more accessible to the mobile robot. Further, as the mobile robot operates without a tether, the use of the deployable docking station allows for increased inspection time for the robots without compromising the maneuverability or versatility of the robot. Additionally, in situations in which the inspection time will be longer than the battery life of the robot, the docking station, in certain embodiments, can move independently to a location closer to the robot such that the robot can return to the docking station to charge its battery and quickly return to inspecting once its battery has been charged.

In one example of use, the deployable docking station 110 is provided in conjunction with a magnetic crawler robot (robot comprising magnetic wheels). In an initial configuration, the station and the robot are coupled (i.e., in the first condition) such that the robot is carrying the station along ferromagnetic pipes of an industrial complex. In this example, the magnetic crawler can move horizontally, vertically, or in an inverted fashion along the ferromagnetic pipes. As the crawler robot is moving along the pipe with the deployable docking station, a signal is sent to the robot to switch from the first condition to the second condition, and then to inspect a particular location on the pipeline. Upon receiving the signal, the anchor of the docking station, which comprises permanent magnets, first engages the surface of the ferromagnetic pipe. Once the anchor is engaged with the surface of the pipe, the crawler robot is then de-coupled from the docking station. The anchor engages the surface prior to de-coupling to ensure that the deployable docking station does not move or fall from the pipe upon de-coupling. This feature is particularly important in instances in which the crawler robot and docking station are traversing the pipe in an inverted fashion.

Once the crawler robot has de-coupled from the docking station, the crawler robot begins its inspection of the specified location of the pipeline. In the second condition, the crawler robot has greater maneuverability than in the first condition because it is no longer carrying the weight of the docking station, and in instances in which the docking station includes a tether, the crawler robot can move freely without concern that the tether will be twisted or tangled. When the crawler robot has completed its inspection task, is running low on battery or supplies, or needs to communicate with a base station, the crawler robot can return to the deployable docking station to re-couple with the station.

To assist with re-coupling, during the inspection by the crawler robot, the deployable docking station can beam a low-power laser along the length of the pipe, as the mobile robot 115 runs its inspection on the pipe. In this example, the crawler robot is following a helical path during its inspection of the pipe such that, during the inspection, the crawler robot is notified every time it crosses the laser beam, thereby providing an additional point of reference for the localization estimate. This allows for greater accuracy in estimating the location of the mobile robot, thereby allowing it to more easily return to the deployable docking station.

To re-couple, the detachable couple of the deployable docking station is first coupled with the crawler robot, and then the anchor is disengaged from the surface of the pipe. Here, the detachable couple and the crawler robot couple prior to disengagement of the anchor from the surface to ensure that the deployable docking station does not move or fall from the pipe prior to re-coupling.

When the crawler robot and the station have re-coupled and the anchor has been disengaged from the surface, the crawler robot can then move with the docking station to a second location along the pipeline for a new inspection and repeat the de-coupling and inspection processes. Alternatively, during re-coupling at the first location, the crawler robot can recharge its battery, de-couple, and then continue its inspection of the first location. Further, during re-coupling at the first location, the crawler robot can, deposit a sample with the docking station that was collected during inspection, and then de-couple in order to continue inspecting the first location.

Finally, when the crawler robot is finished with all of its inspections, it can re-couple with the deployable docking station and transport the docking station off of the pipeline to a base station.

It should be understood that various combinations, alternatives, and modifications of the present invention could be devised by those skilled in the art. The present invention is intended to embrace all such alternatives, modifications, and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

What is claimed is:

1. A deployable docking station coupleable to at least one mobile robot to provide support services and at least one resource to the at least one mobile robot when coupled thereto by a coupling, the at least one mobile robot being of the type that is capable of traversing a surface, the deployable docking station comprising:
   a housing;
   an anchor connected to the housing configured to selectively engage with the surface,
   wherein the deployable docking station is configured to alternate, selectively, between a first condition in which the at least one mobile robot and the deployable docking station are engaged via the coupling and the anchor is disengaged from the surface, wherein in the first condition the at least one mobile robot is configured to transport the deployable docking station to a desired location along the surface, and a second condition in which the at least one mobile robot and the deployable docking station are disengaged and the anchor is engaged with the surface, wherein in the second condition the at least one mobile robot is configured to move along the surface without the deployable docking station and the deployable docking station remains stationary at the desired location along the surface; and
   a sensor attached to the housing and configured to confirm engagement of the anchor with the surface and engagement of the at least one mobile robot and the deployable docking station via the coupling during the alternations between the first and second conditions, and
   wherein the alternation from the first condition to the second condition is controlled such that the deployable docking station cannot disengage from the at least one mobile robot absent confirmation by the sensor of engagement of the anchor with the surface.

2. The deployable docking station of claim 1, wherein the deployable docking station further comprises a control module comprising a non-transitory storage medium and a processor operatively coupled to the storage medium, the processor being configured to execute one or more software modules stored on the storage medium, wherein the control module is connected to the housing and configured to receive and transmit data from the at least one mobile robot.

3. The deployable docking station of claim 2, wherein the control module is configured to selectively alternate the deployable docking station between the first condition and the second condition via a signal from the control module to the at least one mobile robot.

4. The deployable docking station of claim 1, further comprising:
a tether connected to the housing, wherein the at least one resource is provided by the tether.

5. The deployable docking station of claim 1, further comprising:
an on-board supply source, wherein the at least one resource is provided by the on-board supply source.

6. The deployable docking station of claim 1, wherein the at least one resource is a consumable resource.

7. The deployable docking station of claim 6, wherein the consumable resource comprises at least one of power, air, pressurized air, gas, oil, fuel, paint or water.

8. The deployable docking station of claim 1, wherein the at least one resource is a nonconsumable resource.

9. The deployable docking station of claim 8, wherein the nonconsumable resource comprises at least one of a communication resource or an environmental protection feature.

10. The deployable docking station of claim 9, wherein the communication resource is provided via a communication protocol comprising at least one of Wi-Fi, RF, Zigbee, Serial UART, SPI, or i2c.

11. The deployable docking station of claim 1, wherein the deployable docking station further comprises at least one of a Wi-Fi router, a signal repeater, or an access point.

12. The deployable docking station of claim 1, wherein the engagement between the anchor and the surface is at least one of magnetic adhesion, electromagnetic adhesion, vacuum adhesion, suction adhesion, electrostatic adhesion, dry adhesion, or friction-based adhesion.

13. The deployable docking station of claim 1, wherein the anchor comprises one or more permanent magnets.

14. The deployable docking station of claim 13, further comprising an adjustable mount on the anchor, wherein positioning of the one or more permanent magnets on the anchor is adjustable.

15. The deployable docking station of claim 13, wherein the deployable docking station further comprises an electromagnet connected to the housing to counteract the effect of the one or more permanent magnets to disengage the anchor from the surface.

16. The deployable docking station of claim 13, wherein the magnetic flux circuit created by the one or more permanent magnets can be short circuited via a signal from the deployable docking station to disengage the anchor from the surface.

17. The deployable docking station of claim 1, wherein the coupling is a passive coupling mechanism.

18. The deployable docking station of claim 1, wherein the coupling is an active coupling mechanism.

19. The deployable docking station of claim 1, wherein the engagement between the deployable docking station and the at least one mobile robot via the coupling is at least one of magnetic coupling, mechanical coupling, electrical coupling, or electromechanical coupling.

20. The deployable docking station of claim 1, wherein the engagement between the deployable docking station and the at least one mobile robot via the coupling is sparkless.

21. The deployable docking station of claim 20, wherein the engagement between the deployable docking station and the at least one mobile robot via the coupling is via an inductive wireless coupling.

22. The deployable docking station of claim 1, wherein the engagement between the deployable docking station and the at least one mobile robot via the coupling results in the transfer of power from the deployable docking station to the mobile robot.

23. The deployable docking station of claim 1, wherein the deployable docking station further comprises a support connected to the housing, wherein the support is capable of engaging the surface.

24. The deployable docking station of claim 23, wherein the support comprises three support members each capable of engaging the surface.

25. The deployable docking station of claim 24, wherein the support members further include wheels that engage the surface.

26. The deployable docking station of claim 1, wherein the deployable docking station comprises a re-chargeable battery.

27. The deployable docking station of claim 1, wherein the deployable docking station further comprises an actuator connected to the housing and configured to shift the docking station vertically relative to the at least one mobile robot to correct misalignment between the deployable docking station and the at least one mobile robot during coupling.

28. The deployable docking station of claim 1, wherein the deployable docking station has a locomotion system independent of the at least one mobile robot.

29. The deployable docking station of claim 1, wherein the deployable docking station includes one or more solar panels connected to the housing, the solar panels being capable of generating power for at least the deployable docking station.

30. The deployable docking station of claim 1, wherein the deployable docking station is configured to emit a signal that is capable of being received by the at least one mobile robot to assist the at least one mobile robot in locating the deployable docking station.

31. The deployable docking station of claim 30, wherein the signal is at least one of a visible light source, infrared light source, radio signal, or GPS signal.

32. The deployable docking station of claim 1, wherein the deployable docking station further comprises an inspection probe connected to the housing.

33. The deployable docking station of claim 32, wherein the inspection probe provides calibration data to the at least one mobile robot.

34. The deployable docking station of claim 1, wherein the alternation from the second condition to the first condition is controlled such that the anchor cannot disengage from the surface absent confirmation by the sensor of engagement of the deployable docking station with the at least one mobile robot.

35. A deployable docking station coupleable to at least one mobile robot to provide support services and at least one resource to the at least one mobile robot when coupled thereto by a coupling, the at least one mobile robot being of the type that is capable of traversing a surface, the deployable docking station comprising:
a housing;
an anchor connected to the housing configured to selectively engage with the surface,
wherein the deployable docking station is configured to alternate, selectively, between a first condition in which the at least one mobile robot and the deployable docking station are engaged via the coupling and the anchor is disengaged from the surface, wherein in the first condition the at least one mobile robot is configured to transport the deployable docking station to a desired location along the surface, and a second condition in which the at least one mobile robot and the deployable docking station are disengaged and the anchor is engaged with the surface, wherein in the second condition the at least one mobile robot is configured to move along the surface without the deployable docking station and the deployable docking station remains stationary at the desired location along the surface; and a sensor attached to the housing and configured to confirm engagement of the anchor with the surface and engagement of the at least one mobile robot and the deployable docking station via the coupling during the alternations between the first and second conditions, and wherein the alternation from the second condition to the first condition is controlled such that the anchor cannot disengage from the surface absent confirmation by the sensor of engagement of the deployable docking station with the at least one mobile robot.

36. The deployable docking station of claim 35, wherein the deployable docking station further comprises:

a control module comprising a non-transitory storage medium; and a processor operatively coupled to the storage medium, the processor being configured to execute one or more software modules stored on the storage medium, wherein the control module is connected to the housing and configured to receive and transmit data from the at least one mobile robot, and wherein the control module is configured to selectively alternate the deployable docking station between the first condition and the second condition via a signal from the control module to the at least one mobile robot.

37. The deployable docking station of claim 35, wherein the engagement between the anchor and the surface is at least one of magnetic adhesion, electromagnetic adhesion, vacuum adhesion, suction adhesion, electrostatic adhesion, dry adhesion, or friction-based adhesion.

38. The deployable docking station of claim 35, wherein the deployable docking station further comprises an actuator connected to the housing and configured to shift the docking station vertically relative to the at least one mobile robot to correct misalignment between the deployable docking station and the at least one mobile robot during coupling.

39. The deployable docking station of claim 35, wherein the deployable docking station has a locomotion system independent of the at least one mobile robot.

* * * * *